(12) United States Patent
Jacobsen et al.

(10) Patent No.: US 10,994,846 B2
(45) Date of Patent: May 4, 2021

(54) FUNCTIONAL UNIT IN A PASSENGER CABIN, INCLUDING A SUPPORT UNIT AND A PASSENGER SEAT SYSTEM

(71) Applicant: Airbus Operations GmbH, Hamburg (DE)

(72) Inventors: Sönke Jacobsen, Kölln-Reisiek (DE); Marcus Stahlfast, Hamburg (DE); Juliane Gerken, Hamburg (DE); Sven Mittelstaedt, Hamburg (DE); Julian Harpenau, Rosengarten (DE); Fabian Nowacki, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 340 days.

(21) Appl. No.: 15/938,880

(22) Filed: Mar. 28, 2018

(65) Prior Publication Data
US 2018/0281972 A1 Oct. 4, 2018

(30) Foreign Application Priority Data

Mar. 30, 2017 (DE) ..................... 10 2017 106 862.7

(51) Int. Cl.
*B64D 11/06* (2006.01)
(52) U.S. Cl.
CPC ...... *B64D 11/0696* (2013.01); *B64D 11/0639* (2014.12); *B64D 11/0698* (2014.12); *B64D 11/062* (2014.12)
(58) Field of Classification Search
CPC ............ B64D 11/0639; B64D 11/0696; B64D 11/0698
See application file for complete search history.

(56) References Cited

U.S. PATENT DOCUMENTS

| 2,556,076 A | 6/1951 | Evans et al. |
| 4,580,832 A | 4/1986 | Maruyama et al. |
| (Continued) | | |

FOREIGN PATENT DOCUMENTS

| CN | 202 987 504 U | 6/2013 |
| DE | 34 17 945 A1 | 11/1984 |
| (Continued) | | |

OTHER PUBLICATIONS

German Search Report for German Application No. 10 2017 106 862.7 dated Feb. 1, 2018.

*Primary Examiner* — Anthony D Barfield
(74) *Attorney, Agent, or Firm* — Jenkins, Wilson, Taylor & Hunt, P.A.

(57) ABSTRACT

A functional unit in a passenger cabin includes a support unit and a passenger seat system. The passenger seat system is formed in two parts and has an upper constructional unit and a lower constructional unit that are each separate components, the upper constructional unit arranged on the support unit and containing at least one backrest, and the lower constructional unit containing a seat frame, at least one seat element and restraint for the passenger on the seat. The seat frame is fastenable to seat rails on the floor of a passenger cabin. For the use position, the upper and lower constructional units are positioned such that a passenger seat is formed. In the use position, personal comfort for the individuals on the seats is not impaired as far as possible, and the division of the seat system into two parts cannot be seen by the user.

13 Claims, 3 Drawing Sheets

(56) References Cited

U.S. PATENT DOCUMENTS

| | | | |
|---|---|---|---|
| 6,460,922 B1 | 10/2002 | Demick | |
| 8,770,659 B2 * | 7/2014 | Isherwood | B64D 11/0691 |
| | | | 297/14 |
| 9,493,093 B2 * | 11/2016 | Stingle | B60N 2/062 |
| 9,511,867 B2 * | 12/2016 | Schliwa | B64D 11/0691 |
| 9,656,751 B2 | 5/2017 | Schliwa et al. | |
| 2007/0114832 A1 | 5/2007 | Voigt | |
| 2014/0097661 A1 | 4/2014 | Loher | |
| 2018/0201377 A1 | 7/2018 | Roth et al. | |

FOREIGN PATENT DOCUMENTS

| | | |
|---|---|---|
| DE | 103 58 951 A1 | 7/2005 |
| DE | 10 2011 011 704 A1 | 12/2012 |
| DE | 10 2012 109 597 A1 | 4/2014 |
| DE | 10 2015 116 585 A1 | 3/2017 |

\* cited by examiner

FUNCTIONAL UNIT IN A PASSENGER CABIN, INCLUDING A SUPPORT UNIT AND A PASSENGER SEAT SYSTEM

CROSS-REFERENCE TO RELATED APPLICATION

This application claims priority to German Patent Application DE 10 2017 106 862.7 filed Mar. 30, 2017, the entire disclosure of which is incorporated by reference herein.

TECHNICAL FIELD

The disclosure herein relates to a functional unit in a passenger cabin, including a support unit and a passenger seat system.

BACKGROUND

Vehicles which serve for transporting passengers and have a cabin with passenger seats arranged therein are customarily designed in accordance with economical aspects and frequently provide as large a passenger capacity as possible. In addition to the integration of passenger seats, further equipment features are required, in particular for longer distances to be covered by the vehicle, in order to ensure the well-being of the passengers. For example, a plurality of toilets are necessary, which are provided in independent cabin monuments.

The increase in passenger capacity while keeping the dimensions of the vehicle the same is difficult to achieve without restricting the comfort of the passengers. Concepts are known, in particular for skillfully providing cabin monuments with a plurality of functions, thus affording an advantage when using the existing construction space.

For example, DE 102011011704 A1 presents a modular cabin segment for a vehicle having segment modules arranged next to one another, wherein one, for example, accommodates a toilet arrangement with at least one toilet room and another can have kitchen equipment. At least one of the modules can have a vehicle companion seat which is mounted on the relevant module so as to be pivotable on one side about an axis.

DE 102015116585 A1 presents an aircraft cabin element which, at least on one side wall, has sections which correlate with seat elements arranged in the aircraft cabin and therefore permit an improved utilization of space in the aircraft cabin.

SUMMARY

It is an object of the disclosure herein to disclose an arrangement in a cabin of a vehicle and in particular of an aircraft, which permits better spatial use of the passenger cabin and nevertheless provides a high degree of comfort. Such an object is solved by a functional unit in a passenger cabin, including a support unit and a passenger seat system with features as disclosed herein.

A functional unit in a passenger cabin, including a support unit and a passenger seat system, is disclosed, wherein the passenger seat system is formed in two parts and comprises an upper and a lower constructional unit. The upper constructional unit has at least one backrest which is arranged on the support unit, and the upper constructional unit is configured in accordance with the safety requirements for monuments (dynamic 9 g loadings). The lower constructional unit has a seat frame, at least one seat element and a restraint for securing the passenger on the seat, wherein the lower constructional unit is configured in accordance with the safety requirements for aircraft passenger seats (dynamic 16 g loadings). The seat frame is fastenable to seat rails of a passenger cabin, and, for the use position, the upper and lower constructional units are positioned in such a manner that a passenger seat is formed.

This functional unit is a spatially compact arrangement of a plurality of elements which each provide a different function in the arrangement, but, by the special arrangement, symbiotically lead to better space utilization within the vehicle. According to the disclosure herein, it is possible, with this separation of the passenger seat system into an upper and lower component, to use the space in the vicinity of a cabin monument efficiently even for passenger seats. An upper region of the housing of a monument, a monument side wall, can be designed in an advantageous manner and provided with the backrest of a passenger seat. The lower component which contains the seat frame, at least one seat element and the restraint for securing the seated passenger is fastenable to seat rails. This fastening of the lower component to seat rails in the passenger cabin is possible with customary seat fittings.

Because of the configuration of the seat rails which permit a possible position adaptation of the seat frame within the one inch grid, in the use position the upper and lower components can form a passenger seat which is positioned directly on a cabin monument. In this use position, the personal comfort for the individuals on the seats is not impaired as far as possible by this configuration, and the division of the seat system into two parts cannot be seen by the user.

The at least one passenger seat serves for accommodating passengers in the cabin of the vehicle. The passenger seat is formed from the lower and the upper constructional unit and, in the use position, no separation into the two constructional units can be seen. The backrest and preferably a head restraint of a relevant seat should be configured as in a conventional seat and are fastened as an upper constructional unit to the support unit. This mechanical connection has to be configured in such a manner that the safety requirements for cabin monuments (dynamic 9 g loadings) are kept to. A special feature includes that the lower constructional unit is mechanically connected as an independent component to the seat rail. The lower constructional unit contains the restraint necessary for a passenger seat, and, for the approval of a seat part of this type, safety requirements for aircraft passenger seats (dynamic 16 g loadings) should be taken into consideration.

Advantageous embodiments and developments can be gathered from the dependent claims and the description below.

The disclosure herein furthermore relates to a passenger cabin for a vehicle, having a plurality of seats and at least one functional arrangement of this type.

The disclosure herein furthermore relates to a method for producing a functional unit within an aircraft cabin. In a first step, the support unit is provided with the upper constructional unit, wherein the method step is carried out during the production of the cabin component in manufacturing regions outside the end assembly line of a passenger aircraft. In a second step, the support unit is positioned and fastened at the designated position in the aircraft cabin, in a third method step, the lower constructional unit is positioned in the aircraft cabin in the direct vicinity of the support unit in such a region that the upper and lower constructional units together form a passenger seat system, and, in a fourth method step, the lower constructional unit is fixed on the floor of the aircraft cabin.

BRIEF DESCRIPTION OF THE DRAWINGS

Further features, advantages and use possibilities of the disclosure herein emerge from the description below of the exemplary embodiment in the figures. All of the features which are described and/or are illustrated pictorially form, by themselves and in any combination, the subject matter of the disclosure herein also regardless of their inclusion in the individual claims of the dependency references thereof. Furthermore, in the example figures, the same reference signs stand for identical or similar objects.

DETAILED DESCRIPTION

Figure 1:
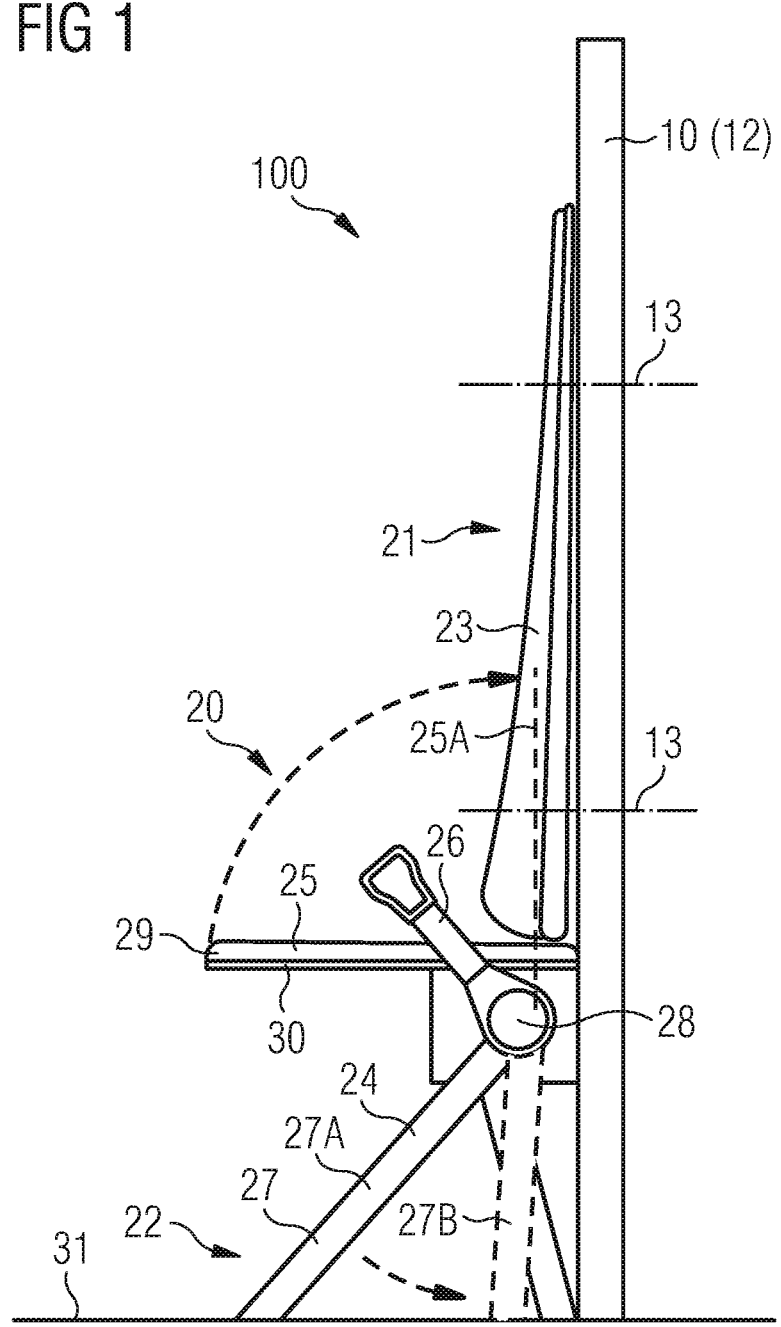
FIG. 1 shows a functional unit in a passenger cabin, including a support unit and a passenger seat system, in a schematic illustration.

FIG. 1 shows an illustration of a functional unit 100. The functional unit 100 is formed from a passenger seat 20, also called a passenger seat system. The passenger seat system 20 here refers to the entirety of elements which are functionally connected to one another and form an outwardly delimited structure (the passenger seat). The passenger seat system 20 has an upper constructional unit 21 and a lower constructional unit 22. These two constructional units 21 and 22 are designed as separate constructional units and, in the correct positioning, produce a useable passenger seat system 20.

The upper constructional unit 21 is arranged on a support unit 10. The support unit 10 can preferably be a cabin monument wall 12 or a partition within a passenger cabin. The upper constructional unit 21 has at least one backrest 23. The upper constructional unit 21 is fixed to the support unit 10 by fastening elements 13. The constructional unit 21 is preferably arranged at such a height that the backrest 23 has the height provided for the use position of the seat. In an alternative embodiment, it is likewise conceivable for the upper constructional unit 21 to be at least partially integrally combined with the support unit 10.

An important feature of the upper constructional unit 21 is that it is configured in accordance with the safety requirements for monuments (dynamic 9 g loadings). The lower constructional unit 22 has a seat frame 24, at least one seat element 25 and restraint 26 for securing the passenger on the seat, wherein the lower constructional unit 22 is configured in accordance with the safety requirements for aircraft passenger seats (dynamic 16 g loadings). The seat frame 24 is fastenable to seat rails 31 (only indicated schematically) on the floor of a passenger cabin 1, and, for the use position, the upper and lower constructional units 21 and 22 are positioned in such a manner that a passenger seat 20 is formed.

This fastening of the lower component 22 to seat rails 31 in the passenger cabin is possible with customary seat fittings. Because of the design of the seat rails which permit a possible position adaptation of the seat frame within the 1 inch grid, in the use position the upper and lower components can form a passenger seat which is positioned directly on a cabin monument.

In the use position, it is therefore not possible for the passenger to see that she/he is using a two-part passenger seat system 20. In the use position, the seat frame 24 is fixed by the at least one front seat leg in the illustrated position 27A. The restraint 26, preferably a seat belt, is fixed to the seat frame 24, advantageously in the upper region of the seat frame 24.

An alternative connection of the seat belt 26 would also be a combination of fastening points on the seat frame 24 and on structure-mounted parts in the passenger cabin 10. The seat rails 31 or the support unit 10 can be mentioned here as possible embodiments. A further alternative is the possibility of fixing the restraint 26 directly on the seat rail 31, permitting the introducing of load into the aircraft structure.

The seat element 25 is mounted on the seat frame 24 and has a seat cushion 29 and a seat pan 30.

In a preferred configuration, the passenger seat system 20 can also be brought into a stowage position.

For this purpose, the seat frame 24 has at least one moveable seat leg 27 which, for a stowage position 27B, can be folded in in the direction of the support unit 10 by rotation about a hinge point 28. To this end, the seat leg 27 can be released from the seat rail 31 and displaced therein. However, complete removal of the lower end of the seat leg 27 from the rail 31 and corresponding folding away of the leg are also possible.

In order to obtain a further space saving in the stowage position, the seat element 25 is likewise designed to be foldable. This position 25A of the seat element is shown in FIG. 1 in an illustration by dashed lines. Alternatively (not shown), the seat element 25 can also be folded down in the direction of the floor.

In order to achieve a further space saving for folding away the seat element 25, the seat cushion 29 can be designed to be at least partially inflatable. For this purpose, "self inflation" can be achieved by opening air valves. A corresponding seat cushion 29, the thickness of which is increased, is useable by closing the air valves. An inflatable cushion principle can thus likewise be used for the backrest 23 and can therefore contribute to a space-saving, comfort-increasing passenger seat system 20.

For the stowage position of the passenger seat system, in particular of the lower constructional unit 21, it is expedient to position the latter leaning against the support unit 10.

Figure 2:
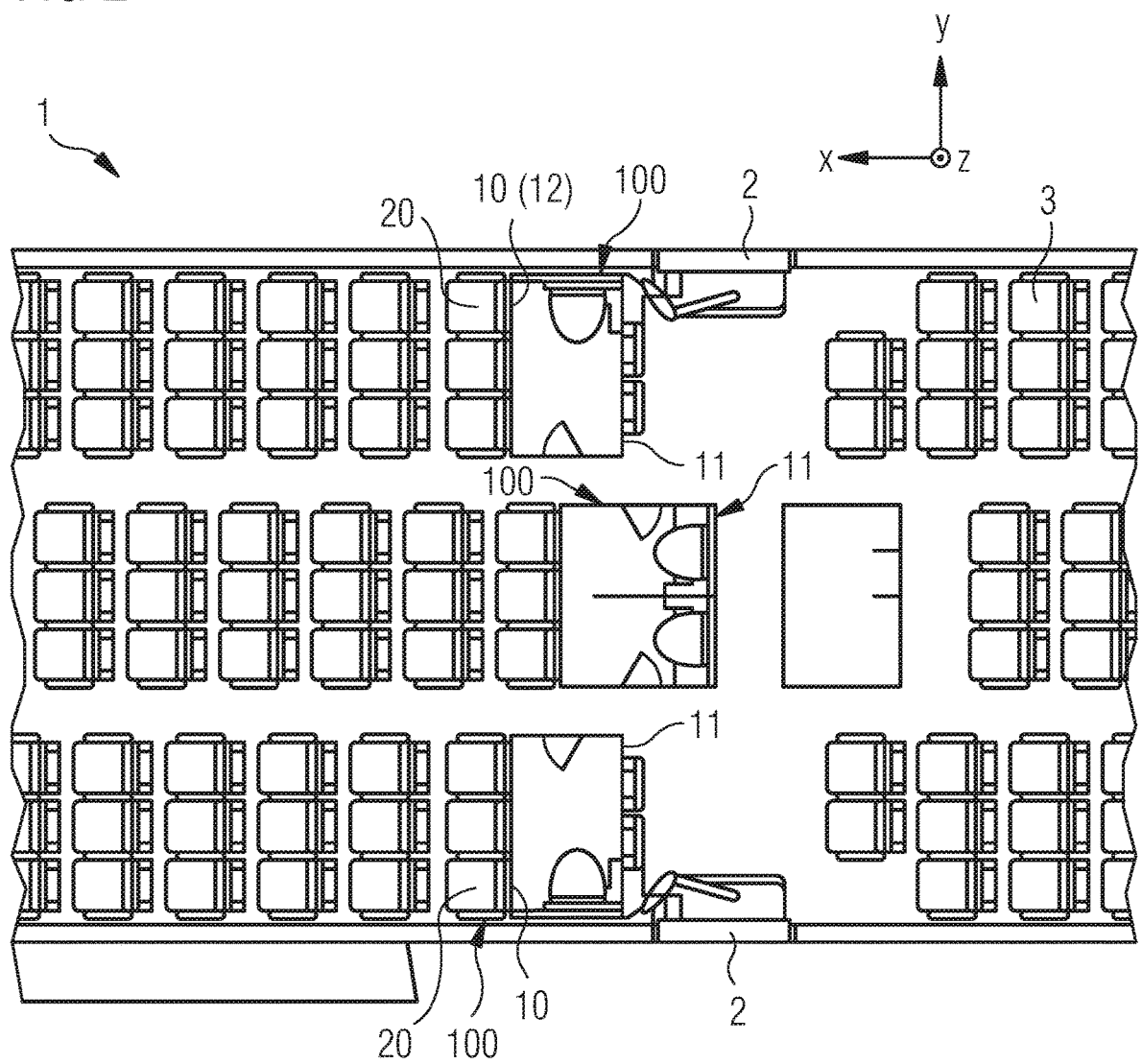
FIG. 2 shows a passenger cabin of an aircraft in an illustration of the cabin layout.

FIG. 2 discloses a cabin 1 of an aircraft, wherein the cabin 1 is provided with seat rows 3 and monuments 11. The functional units 100 are preferably arranged in a region located between two doors 2. Cabin monuments 11, such as toilets or else partitions (not shown here), are preferably positioned in the region.

The functional unit 100 including passenger seat system 20 and support unit 10 is advantageously provided here. The support unit 10 is formed by the cabin monument wall 12. The functional unit 100 is a spatially compact arrangement of a plurality of elements which each provide a different function in the arrangement, but, by the special arrangement, symbiotically lead to better use of space within the aircraft cabin 1.

According to the disclosure herein, the passenger seat system 20, the upper component 21 of which is arranged on the cabin monument wall 12, makes it possible to use the space in the vicinity of a cabin monument 11 efficiently even for passenger seats.

Figure 3:
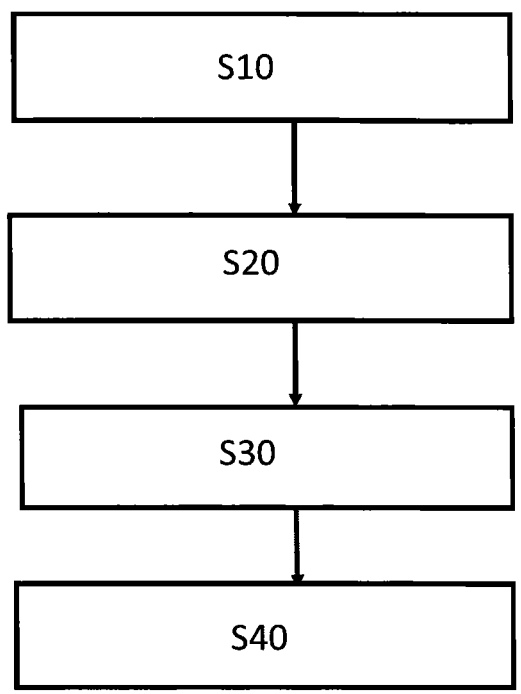
FIG. 3 shows, in a schematic illustration, the method for producing a functional unit according to the disclosure herein.

FIG. 3 presents a example of a method for producing the functional unit 100 within an aircraft cabin 1. The method comprises, in a first step S10, providing the support unit 10 with the upper constructional unit 21. For this purpose, the upper constructional unit 21 is positioned and fixed on the support unit 10 at such a height that the lower constructional unit 22, necessary for completion to form a functional passenger seat 20, can be brought together with the upper constructional unit 21 in a later method step. For this purpose, the lower edge of the upper constructional unit 21 is substantially positioned at the height of the upper plane of the lower component 22, which is substantially formed by the seat element 25. This method step S10 is customarily carried out during the production of the cabin component in manufacturing regions outside the end assembly line of a passenger aircraft. In the further method step S20, the support unit 10 is installed in the aircraft cabin 1. The support unit 10 is designed, for example, as a partition or as part of a cabin monument wall 12. The support unit 10 is positioned and fastened at the designated position in the aircraft cabin 1.

In the further method step S30, the lower constructional unit 22 is positioned in the aircraft cabin 1. This takes place in the direct vicinity of the support unit 10 in such a position that upper and lower constructional units 21 and 22 in the assembled state form a passenger seat system 20.

For the manufacturing of the functional unit 100, in a method step S40 the lower constructional unit 22 is fixed on the floor of the aircraft cabin 1. The fastening advantageously takes place in seat rails which customarily run in the longitudinal direction in aircraft cabins and provide the corresponding connection points for the seating of the aircraft cabin in accordance with a predefined seat layout.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBERS

1 Aircraft passenger cabin
2 Aircraft doors
3 Seat rows/seats
100 Functional unit
10 Support unit
11 Cabin monument
12 Cabin monument wall
13 Fastening means on support unit
20 Passenger seat system
21 Upper constructional unit
22 Lower constructional unit
23 Backrest
24 Seat frame
25 Seat element
25A Seat element in stowage position
26 Restraint
27 Seat leg
27A, 27B Seat lug in use position+stowage position
28 Hinge point
29 Seat cushion
30 Seat pan
31 Seat rails

The invention claimed is:

1. A functional unit in a passenger cabin, comprising:
a support unit; and
a passenger seat system comprising two parts, an upper constructional unit and a lower constructional unit;
wherein the upper and lower constructional units are each separate components;
wherein the upper constructional unit is arranged on the support unit and comprises at least one backrest;
wherein the lower constructional unit comprises a seat frame, at least one seat element, and a restraint for securing a passenger on the passenger seat system;
wherein the seat frame is fastenable to one or more seat rails on a floor of the passenger cabin;
wherein, in a use position, the upper and lower constructional units are positioned such that a passenger seat is formed; and
wherein, in a stowage position, the lower constructional unit is pivotable from the use position in an upwards direction, into a position adjacent to the upper construction unit, and in a downwards direction, into a position adjacent to the support unit.

2. The functional unit according to claim 1, wherein the upper constructional unit is arranged on the support unit at such a height that, in the use position, a correlation with the lower constructional unit results in a passenger seat.

3. The functional unit according to claim 1, wherein the upper constructional unit is configured in accordance with dynamic loads together with the support unit.

4. The functional unit according to claim 1, wherein the lower constructional unit is configured in accordance with dynamic loads of the passenger seat.

5. The functional unit according to claim 1, wherein the support unit is a cabin monument wall.

6. The functional unit according to claim 1, wherein the support unit is a partition.

7. The functional unit according to claim 1, wherein the lower constructional unit is attached to the one or more seat rails.

8. The functional unit according to claim 1, wherein the seat element comprises a seat pan and a seat cushion.

9. The functional unit according to claim 8, wherein the seat cushion and/or the backrest is dividable and/or inflatable to change a thickness of the seat cushion and/or the backrest.

10. The functional unit according to claim 9, wherein the seat cushion and/or the backrest is configured for self-inflation via air valves.

11. The functional unit according to claim 1, wherein the seat element is foldable.

12. The functional unit according to claim 1, wherein the seat frame has at least one foldable seat leg.

13. A passenger cabin for a vehicle, comprising a plurality of seats and at least one functional unit according to claim 1.

* * * * *